Feb. 17, 1925.　　　　　　　　　　　　　　　　　　1,527,147
R. C. NEWHOUSE
TIRE MOUNTING
Filed Feb. 25, 1924

Inventor
R. C. Newhouse
by
Attorney

Patented Feb. 17, 1925.

1,527,147

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

TIRE MOUNTING.

Application filed February 25, 1924. Serial No. 695,136.

*To all whom it may concern:*

Be it known that I, RAY C. NEWHOUSE, a citizen of the United States, residing at Wauwatosa, in the county of Milwaukee and State of Wisconsin, have invented a certain new and useful Improved Tire Mounting, of which the following is a specification.

This invention relates in general to improvements in the construction of supports for rotating elements and relates more specifically to an improved tire mounting and retainer especially applicable to the tires of rotating drums such as kilns, dryers, tube mills or the like.

An object of the invention is to provide a tire mounting which is simple in construction and efficient in operation.

In the construction of rotary kilns and the like, it is customary to support the shell or drum by means of rollers which coact with one or more tires embracing the drum. The drum is ordinarily constructed of sheet metal which, in spite of the provision of heat insulating linings, is subject to considerable expansion and contraction due to variations in temperature. The tires are ordinarily formed by casting and of relatively massive construction thus making them relatively immune to expansion due to radiation of heat from the interior of the kiln. When such tires are rigidly attached to the drum as by riveting or bolting, the differences in expansion and contraction between the shell and the tires, cause the fastening elements to break thereby releasing the tire and permitting displacement thereof along the drum.

The present improvement contemplates provision of a tire mounting for kilns and the like, in which the tire is not directly rigidly clamped to the shell thus eliminating objectionable breakage of rivets or the like. In accordance with the present invention, the tires are not necessarily fixed against rotation relatively to the shell but are retained substantially coaxial therewith by means of filler blocks which are inserted in spaces provided between the tires and the shell. Relative displacement of the tires along the shell is, however, positively prevented by means of suitable abutments coacting with end surfaces of the tires. The filler blocks and the abutments may be riveted or otherwise attached directly to the drum, but the tires are at most frictionally retained and may be free from contact with the drum at places remote from the supporting rollers.

A clear conception of an embodiment of the invention may be had by referring to the drawing accompanying and forming a part of this specification in which like reference characters designate the same or similar parts in the various views.

Figure 1:
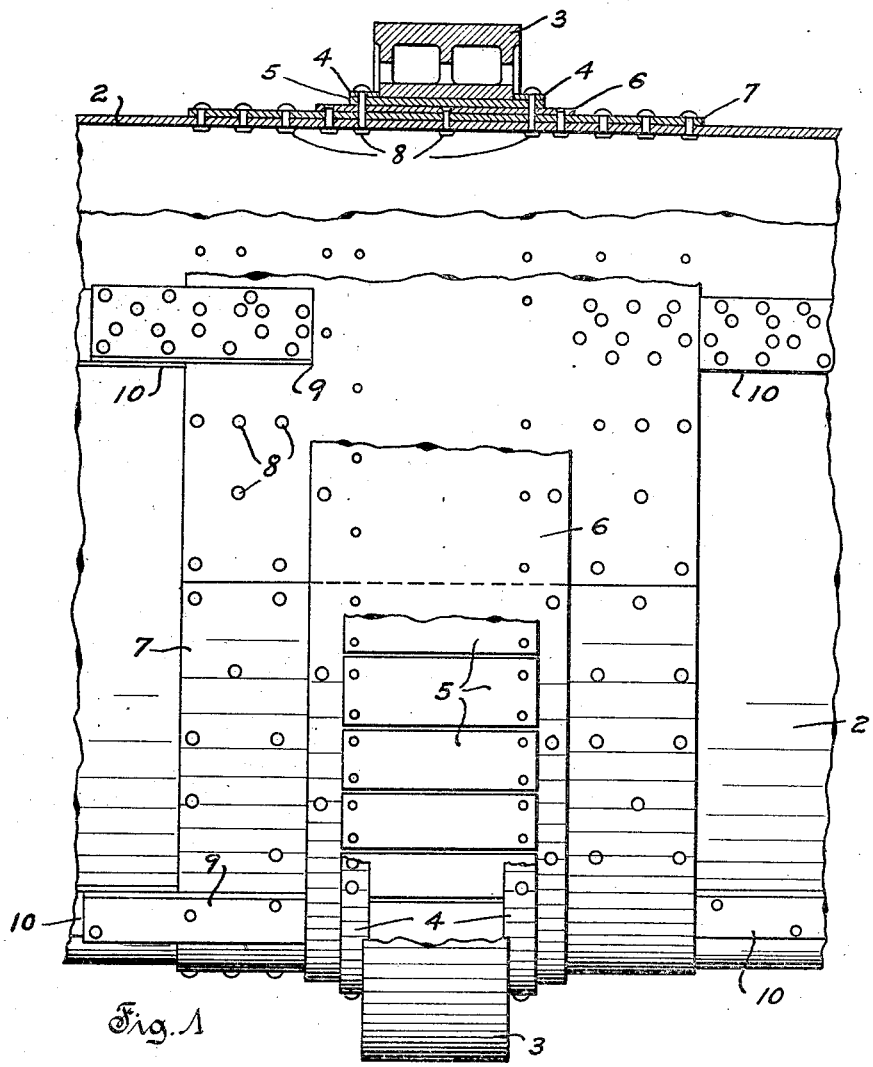
Fig. 1 is a fragmentary part sectional view of that portion of a rotary kiln adjacent to one of the supporting tires thereof.
Figure 2:
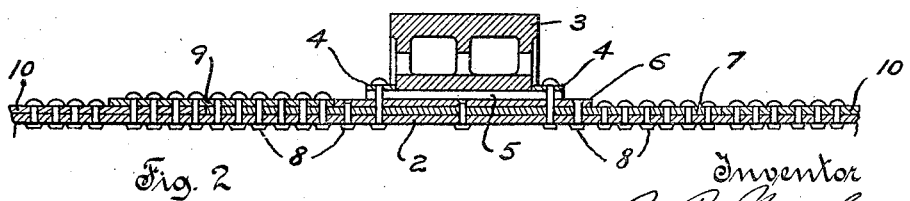
Fig. 2 is a fragmentary sectional view taken through another portion of the kiln and tire.

The shell or drum 2 of a rotary kiln, dryer, tube mill or the like, is ordinarily formed of one or more plates which are end united to form the complete drum, by means of stay plates 10 disposed substantially parallel to the longitudinal axis of the drum. The shell 2 and stay plates 10 are ordinarily formed of sheet metal and the stay plates 10 are attached to the segments of the shell by riveting, welding, or otherwise. One or more annular tires 3 ordinarily formed of relatively massive construction and by casting, embrace the drum 2, these tires having internal bores somewhat larger than the external diameter of the drum 2. In order to secure sufficient bearing between the relatively thin shell 2 and the tire 3, a number of annular plates 6, 7 are disposed within the space between the drum 2 and the tire 3, these plates being secured directly to the drum 2 by means of rivets 8. As shown in the drawing, the inner plate 7 is considerably wider than the outer plate 6, and in kilns of large diameter, these plates would ordinarily comprise a plurality of end abutting segments. In some instances it may be preferable to provide lap plates 9 joining the stay plates 10 with the annular plate 7.

Disposed within the annular space between the outer annular plate 6 and the tire 3, is an annular series of filler blocks 5 extending transversely of the tire 3. These filler blocks 5 are ordinarily inserted endwise in the space between the plate 6 and the tire 3 and may in some instances frictionally hold the tire 3 against rotation relatively to the shell 2, although the enormous weight of the loaded drum makes it unnecessary to positively prevent relative rotation of the drum 2 and tires 3. The ends of the plates or blocks 5 project beyond the tire 3 and annular ring abutments 4 coact with these projecting ends of the blocks 5. The ring abutments 4 also are adapted to coact with the opposite end surfaces of the tire 3 and are riveted to the blocks 5, plates 6, 7 and to the shell 2 by means of an annular series of rivets 8. It will be obvious that the ring abutments 4 positively prevent undesirable displacement of the tire 3 along the drum 2.

In constructing the kiln, the drum 2 is first assembled and the plates 6, 7, 9 and 10 are riveted thereto by means of rivets 8. The rivets which pass through the shell 2 and both of the plates 6, 7 are formed with external countersunk heads in order to leave a smooth external surface upon the annular plate 6. The tire 3 is then slipped over the plate 6 after which the filler blocks 5 are inserted endwise. The ring abutments 4 may then be properly positioned and the rivet holes for the long rivets which retain the ring abutments 4 in place, may then be drilled and these rivets applied.

It will be obvious that with a tire thus mounted, the danger of breaking undesirably long rivets due to unequal expansion or contraction, is eliminated. As the tires 3 are applied when the drum 2 is cold and liberal clearances are ordinarily allowed between the tires and the blocks 5, subsequent heating and cooling of the drum will not affect the rivets 8. If it becomes necessary to remove one of the tires 3, it is only necessary to remove the rivets 8 which hold the ring abutments 4 and the filler blocks 5 in place, whereupon the ring abutments are freely removable and the filler blocks 5 may be withdrawn from normal position.

It should be understood that it is not desired to limit the invention to the exact details of construction herein shown and described, for obvious modifications within the scope of the claims may occur to persons skilled in the art.

It is claimed and desired to secure by Letters Patent:

1. In combination, a drum, an annular tire embracing said drum, and ring abutments coacting with opposite sides of said tire to prevent displacement thereof relatively to said drum, said tire being free from direct attachment to said drum and said abutments being rigidly attached thereto.

2. In combination, a drum, a tire surrounding said drum and having an internal bore which is larger than the external diameter of said drum, a series of filler blocks between said drum and said tire, and abutments coacting with said tire at opposite ends of each of said blocks to prevent displacement of said tire along said drum.

3. In combination, a drum, a tire surrounding and spaced from said drum, filler blocks located in the space between said drum and said tire, and abutments formed independently of said blocks and coacting with said tire to prevent relative displacement of said tire along said drum.

4. In combination, a drum, a tire surrounding and spaced from said drum, an annular series of filler blocks located in the space between said drum and said tire and frictionally engaging the latter, ring abutments coacting with opposite sides of said drum, and common means for rigidly attaching said abutments and said filler blocks to said drum.

5. In combination, a drum, a reenforcing plate surrounding said drum, a tire surrounding and spaced from said plate, an annular series of filler blocks located in the space between said tire and said plate, ring abutments coacting with opposite sides of said tire and engaging said blocks, and common means for uniting said ring abutments, said filler blocks, said plate and said drum.

In testimony whereof, the signature of the inventor is affixed hereto.

RAY C. NEWHOUSE.